United States Patent [19]

Milton et al.

[11] 4,245,953

[45] Jan. 20, 1981

[54] ENGINE TURBOCHARGER WITH CARTRIDGE WASTEGATE VALVE

[75] Inventors: Thomas J. Milton, Essexville; Dennis J. Jones, Saginaw, both of Mich.

[73] Assignee: General Motors Corporation, Detroit, Mich.

[21] Appl. No.: 4,355

[22] Filed: Jan. 18, 1979

[51] Int. Cl.³ .............................................. F01D 17/00
[52] U.S. Cl. .................................................. 415/144
[58] Field of Search .................. 60/600, 601, 602, 603; 415/144, 145; 251/310

[56] References Cited

U.S. PATENT DOCUMENTS

| 2,731,792 | 1/1956 | Nallinger | 60/602 X |
| 3,276,466 | 10/1966 | Herbert | 251/310 X |
| 4,120,156 | 10/1978 | McInerney | 60/602 |

FOREIGN PATENT DOCUMENTS 733197 7/1955 United Kingdom ..................... 251/310

Primary Examiner—Michael Koczo
Attorney, Agent, or Firm—Robert J. Outland

[57] ABSTRACT

An engine turbocharger includes a turbine housing having wastegate passages integral therewith and a cartridge wastegate valve including a ported stationary bushing and a ported tubular valve member rotatable in the bushing to close or open wastegate flow. The arrangement provides simplicity of manufacture and installation as well as a self-cleaning valve design that is unbiased by exhaust gas pressures and thus requires a minimum of operating force.

4 Claims, 5 Drawing Figures

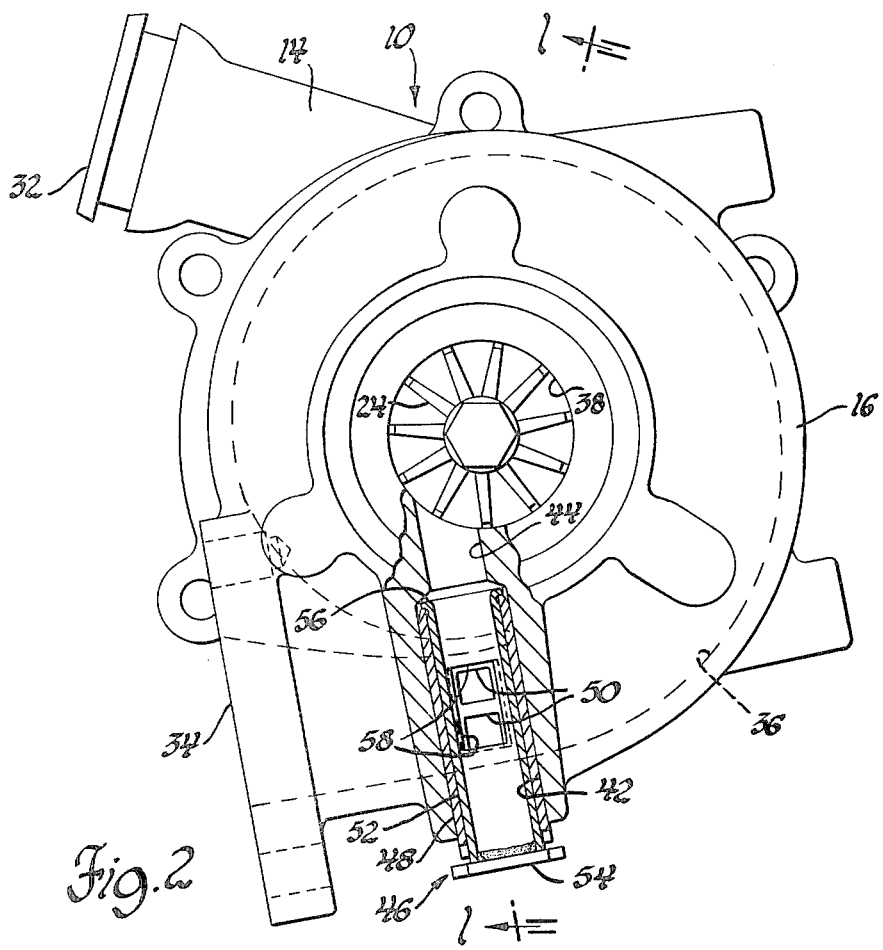
Fig. 2
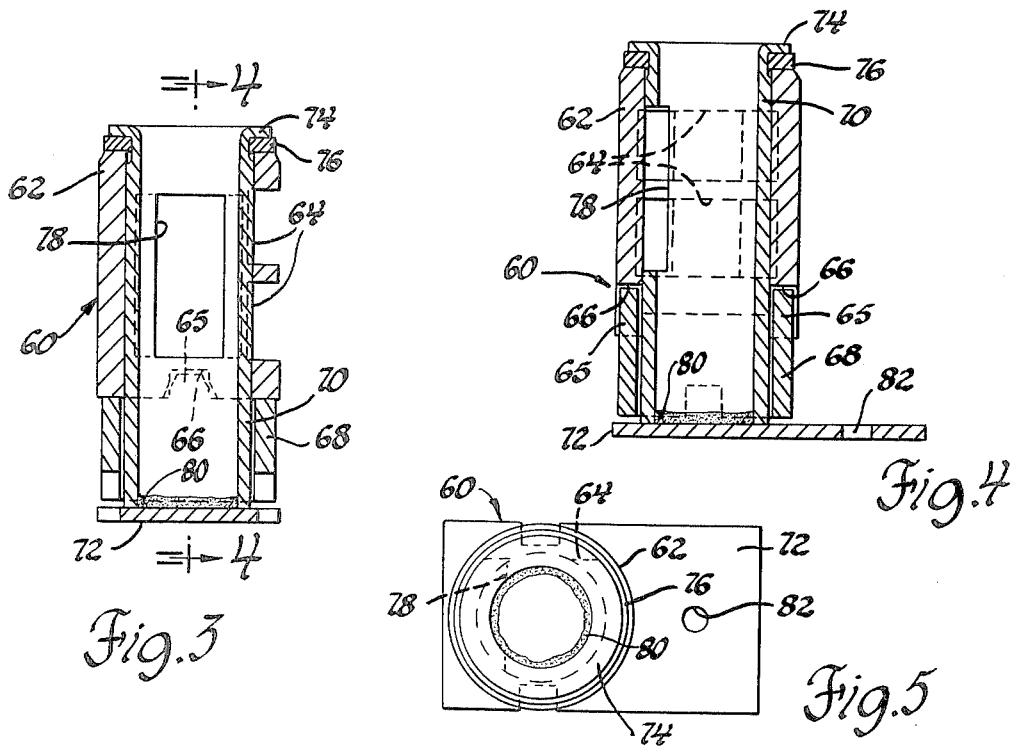
Fig. 3
Fig. 4
Fig. 5

ENGINE TURBOCHARGER WITH CARTRIDGE WASTEGATE VALVE

TECHNICAL FIELD

This invention relates to engine turbochargers and, more particularly, to improved wastegate arrangements for turbochargers having tubular wastegate valves, preferably of the cartridge type.

BACKGROUND OF THE INVENTION

It is known in the art relating to internal combustion engine turbochargers to provide exhaust wastegate devices to bypass some portion of the exhaust gas flow around the turbine and thus provide a means of controlling the boost pressure developed by the compressor. There are many known arrangements and applications of wastegate valves, both separately from and integrated with some portion of the turbocharger assembly. All add some degree of cost and manufacturing complexity to the turbocharger and/or its ultimate installation.

SUMMARY OF THE INVENTION

The present invention provides an improved wastegate arrangement for an engine turbocharger which utilizes a tubular wastegate valve, preferably of the press fitted cartridge type, arranged in a way that simplifies manufacturing complexity and provides a valve not biased in either opening or closing direction by the turbine exhaust gas pressures. One feature of the invention is that the tubular valve has open and closed ends and an intermediate port. The open end connects with a portion of the wastegate passage on one side of the valve, while the intermediate port is rotatable to permit or block flow from a portion of the wastegate passages on the other side of the valve. The tubular valve construction, because it is exposed to engine exhaust pressure only in directions radial and axial of its axis of oscillation, avoids any pressure bias of the valve in an opening or closing direction and thus minimizes the force necessary for normal movement of the valve.

In preferred constructions, the wastegate valve is formed as a preassembled cartridge comprising an outer sleeve with a port in the side wall intermediate its ends and an inner tubular valve member closed at one end by an actuating lever and closely fitted within the sleeve or bushing for oscillating movement therein. The valve member is open at its other end and has a port intermediate its ends which, in assembly, is capable of being aligned with the port in the bushing so as to permit flow into and out of the assembly through the side walls.

A further feature of the invention is that the assembled valve cartridge may be installed by press fitting the assembly within a bore provided in the turbine housing so that the open end of the assembly is aligned with a portion of the bypass passage that extends into communication with the main exhaust gas passage in the turbine housing on one side of the wastegate valve and the bushing is sealingly retained within the housing with its wall port aligned with a portion of the bypass passage connecting with the main turbine exhaust gas passage on the other side of the wastegate valve. The valve assembly is self-cleaning by reason of its rotating sleeve valve member construction.

These and other features and advantages of the invention will be more fully understood from the following description of certain preferred embodiments taken together with the accompanying drawings.

BRIEF DESCRIPTION OF THE DRAWINGS

In the drawings:

FIG. 2 is a turbine end view of the turbocharger of FIG. 1 having a portion broken away to show the interior construction of the wastegate valve assembly;

FIG. 3 is an axial cross-sectional view of an alternative embodiment of wastegate valve cartridge formed in accordance with the invention;

FIG. 4 is an axial cross-sectional view of the valve cartridge of FIG. 3 taken generally in the plane indicated by the line 4—4 of FIG. 3; and FIG. 5 is an end view of the valve cartridge assembly of the embodiment of FIGS. 3 and 4.

BEST MODE FOR CARRYING OUT THE INVENTION

Figure 1:
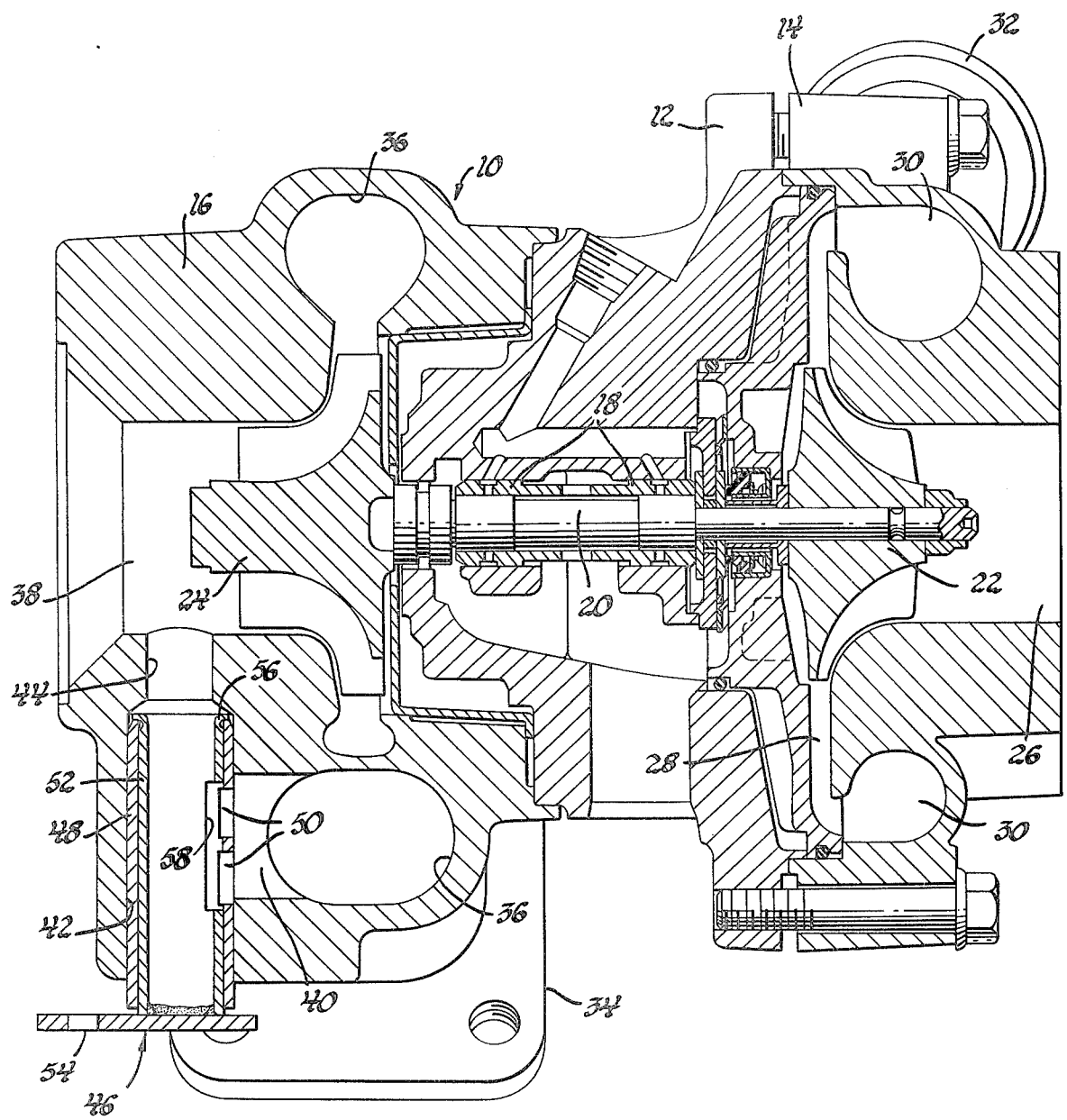
FIG. 1 is a longitudinal cross-sectional view of an engine turbocharger assembly showing a wastegate valve arrangement in accordance with the invention and taken generally in the plane indicated by the line 1—1 of FIG. 2.

Referring now to the drawings in detail, there is shown in FIGS. 1 and 2 a turbocharger generally indicated by numeral 10 and adapted for use with internal combustion engines in known fashion. The turbocharger includes a central bearing housing 12 connected on one side with a compressor housing 14 and on the other with a turbine housing 16.

The bearing housing 12 supports bearings 18 which conventionally journal the shaft 20 of an impeller assembly that includes a compressor wheel 22 supported at one end of the shaft within the compressor housing and a turbine wheel 24 supported at the other end of the shaft in the turbine housing The compressor housing conventionally defines an axial inlet passage 26 and a radial outlet passage 28 connecting with a scroll 30 that leads to an outlet connection 32. In similar fashion, the turbine housing has an inlet connection 34 opening to an inlet scroll 36 that connects radially with the blades of the turbine wheel 24 and therethrough with an axial outlet passage 38.

The turbine housing is also provided internally with a wastegate passage around the turbine including an axial portion 40 extending from the turbine inlet scroll 36 and connecting with a radial portion that includes a drilled bore 42 extending inwardly from the housing exterior and connecting at its end with a smaller bore 44 that opens into the turbine outlet passage 38. The two bores 42, 44 are axially aligned so that they can be formed in the same manufacturing step.

Within the larger bore 42 there is disposed a wastegate valve in the form of a preassembled cartridge generally indicated by numeral 46. Valve 46 includes an outer bushing or sleeve 48 having open ends and a divided or dual opening port 50 intermediate its ends. Within the bushing there is closely but freely fitted a tubular valve member 52 having one end closed by an attached lever 54 secured to the tubular valve member by leak proof means, such as welding. The other end of the valve member is open and includes an outwardly flared lip 56 that extends over the end of the associated bushing 48 and locks the valve member assembly together with the bushing to form the preassembled cartridge.

Intermediate its ends, valve member 52 has an opening 58 in its wall which may be aligned with the dual port 50 of the bushing so as to provide for gas flow through the valve assembly. The valve may also be closed by oscillating movement of the valve assembly around its axis by means of the lever 54 to a position where the port 58 in the valve member is out of registry with the port 50 of the bushing.

In manufacture, the valve cartridge is preassembled, as indicated, and the cartridge unit is then pressed into the larger drilled bore 42 with the dual port 50 of the bushing positioned to open into the axial portion 40 of the turbine wastegate passage. In this position, the open end of the valve connects with the smaller bore 44 that opens to the turbine outlet. Thus, when the valve port 58 is aligned with the bushing port 50, as shown in FIGS. 1 and 2, the valve is open and exhaust gas is permitted to freely flow through the wastegate passage 40, 42, 44, bypassing the turbine. Subsequent oscillating movement of the valve through an arc of 90 degrees, by actuation of the lever 54, will move the valve member port 58 out of registry with the bushing port 50, causing bypass flow through the wastegate passage to be blocked.

Among the advantages of the disclosed wastegate valve and passage arrangement are the fact that the wastegate passage may be simply formed integrally with the turbine housing without the addition of a separate connecting member for mounting the valve. Additionally, the drilled bores are easily formed and the cartridge valve assembly may be accurately preassembled and tested for operativeness prior to installation. The installation is then simply accomplished by pressing the valve assembly in place with the proper orientation. The arrangement also has the advantage that gas pressures acting on the valve assembly have only radial and longitudinal directions and, therefore, do not bias the valve in either an opening or closing direction. Thus, it is not necessary to overcome exhaust gas pressure when rotating the lever to open or close the wastegate valve. Normal opening and closing motion also acts to dislodge deposits from the port edges so that the valve is selfcleaning.

Referring now to FIGS. 3–5, there is shown a cartridge wastegate valve assembly generally indicated by numeral 60 which is in many ways similar to the valve assembly 46 of FIGS. 1 and 2 and is adapted to be used in place of this assembly, if desired. Valve assembly 60 includes an outer bushing member 62 having open ends and a divided side port 64 keyed by lug 65 engaged recesses 66 to a spacer 68. This two-piece construction permits the shorter bushing member to be made from a more expensive bearing like material, while the remaining length of the structure is provided by the spacer member 68 which can be made from less expensive steel.

Within the bushing 62 and spacer 68 there is retained a tubular valve member 70 having one end closed by an attached lever 72, the other end being open and including an outwardly flared flange 74 deformed around a washer 76 that spaces the flange 74 from the end of the bushing 62. The valve member 70 includes an intermediate port 78 which upon oscillative movement of the valve member may be moved into registry with the port 64 of the bushing to open the valve in the same manner as the previously described valve embodiment. At the interface of the valve member 70 and lever 72, the two are secured together in a leak proof manner as by welding at 80. The lever is also provided with an opening 82 for receiving the end of an actuating rod not shown.

While the various features disclosed represent the best mode presently known to the inventor for carrying out the invention, it should be understood that numerous changes could be made within the disclosed embodiments without departing from the inventive concepts inherent in the disclosure. As an example, it would be possible if desired, to modify the wastegate valve to provide increased flow area for an equivalent opening movement. One way this could be done is to provide multiple sets of annularly disposed ports in the valve member and sleeve with an annular passage in the turbine housing portion surrounding the sleeve to carry the gases to the various ports.

In view of these and other changes which could be made, it is intended that the invention not be limited by the specific embodiments disclosed but that it have the full scope permitted by the language of the following claims.

The embodiments of the invention in which an exclusive property or privilege is claimed are defined as follows:

1. The combination in an engine turbocharger of a turbine housing having an internal bypass and a wastegate valve controlling said bypass, said combination comprising a straight bore in the housing forming a portion of the bypass and opening outwardly of the housing to receive the wastegate valve, said valve including a hollow cylindrical valve element open at one end and closed at the other with an intermediate port and received in the bore with the open end connecting with the bypass on one side of the valve, the element being oscillatable about its axis between an open position wherein the port is aligned with the bypass on the other side of the valve from said one side to permit flow through the bypass and valve element and a closed position wherin the port is out of alignment with the bypass and flow therethrough is blocked, and actuating means on the valve element outward of the housing for moving the element between its open and closed positions, said movement being unopposed by pressure in the bypass and said valve being self-cleaning upon movement of the oscillatable valve element.

2. The combination in an engine turbocharger of a turbine housing having an internal bypass, a wastegate valve controlling said bypass, and the improvements comprising a straight bore in the housing forming part of the bypass and opening outwardly of the housing to receive the wastegate valve, said valve comprising the assembly of a tubular sleeve preassembled with and journaling a hollow cylindrical valve element in fixed axial relation permitting relative oscillation of the element in the sleeve, said sleeve having open ends and a port therethrough intermediate the ends, said valve element having an open end and a closed end with an intermediate port capable of being aligned with said sleeve port, said valve assembly being received in said bore with said element closed end blocking the opening and its open end connecting with the bypass on one side of the valve, while the sleeve port connects with the bypass on the opposite side of the valve from said one side, and actuating means for oscillatingly moving said valve element in said sleeve between a closed position where said ports are out of registry and flow through the bypass is blocked and an open position where said ports are in registry and flow through the bypass is permitted, said movement being unopposed by pressure in the bypass and said valve assembly being self-cleaning upon oscillating movement of the valve element.

3. The combination of either claim 1 or 2 wherein said bypass includes a portion extending axially from said straight bore on said one side of the valve to a connection with an outlet passage in the turbine housing, whereby said bore and said bypass portion can be machined together.

4. The combination of claim 2 wherein said housing bore and said valve sleeve are sized to provide an interference fit that permits assembly and retention of the valve in the housing by pressing said valve assembly into its desired position in said bore.

* * * * *